United States Patent
Segawa et al.

(10) Patent No.: US 7,769,517 B2
(45) Date of Patent: Aug. 3, 2010

(54) LOCK-UP CLUTCH CONTROL

(75) Inventors: Satoshi Segawa, Atsugi (JP); Hiroshi Sekiya, Fuji (JP); Tatsuya Imamura, Fuji (JP); Koji Dohi, Fuji (JP); Kouji Saitou, Fuji (JP); Masayuki Kobayashi, Fuji (JP); Masayoshi Nakasaki, Fuji (JP)

(73) Assignee: JATCO Ltd, Fuji-shi (JP)

( * ) Notice: Subject to any disclaimer, the term of this patent is extended or adjusted under 35 U.S.C. 154(b) by 869 days.

(21) Appl. No.: 11/255,076

(22) Filed: Oct. 21, 2005

(65) Prior Publication Data
US 2006/0089776 A1   Apr. 27, 2006

(30) Foreign Application Priority Data
Oct. 25, 2004   (JP)   ............... 2004-310015

(51) Int. Cl.
*G06F 19/00*   (2006.01)
(52) U.S. Cl. .................. 701/68; 701/51; 701/53; 701/58; 701/67; 477/70; 477/77; 477/78; 477/79; 477/166; 477/168; 477/176; 192/85 R
(58) Field of Classification Search ............. 701/51–58, 701/67, 68; 477/70, 77–78, 79, 166, 168, 477/62, 64, 65, 68, 174–176; 192/85 R, 192/3.31
See application file for complete search history.

(56) References Cited

U.S. PATENT DOCUMENTS

| | | | | |
|---|---|---|---|---|
| 4,457,411 A | * | 7/1984 | Hiramatsu | 477/176 |
| 4,468,988 A | * | 9/1984 | Hiramatsu | 477/65 |
| 4,660,697 A | * | 4/1987 | Yoneda et al. | 477/175 |
| 5,147,010 A | * | 9/1992 | Olson et al. | 180/197 |
| 5,176,234 A | * | 1/1993 | Reik et al. | 192/53.2 |
| 5,332,073 A | | 7/1994 | Iizuka | |
| 5,569,117 A | | 10/1996 | Kono et al. | |
| 5,683,329 A | * | 11/1997 | Kono et al. | 477/176 |

(Continued)

FOREIGN PATENT DOCUMENTS

JP   59-200861 A   11/1984

(Continued)

*Primary Examiner*—Khoi Tran
*Assistant Examiner*—Nikhil Sriraman
(74) *Attorney, Agent, or Firm*—Foley & Lardner LLP (57) ABSTRACT

A lock-up clutch control apparatus for controlling a lock-up clutch (6) provided in a torque converter (5) installed between an engine (3) and a transmission (4), is disclosed. The lock-up clutch control apparatus has a differential pressure generator (7,8) which engages, causes a slip of or disengages the lock-up clutch by adjusting the differential pressure supplied to the lock-up clutch (6); a sensor (11/15) for detecting a rotational speed of the engine; a sensor (16) for detecting an input rotational speed to the transmission; and a controller (1). The controller (1) conducts proportional integration control by using a command signal to the differential pressure generator (7,8), so that an actual slip rotational speed, which is the difference between the engine rotational speed (Np) and input rotational speed (Ni) to the transmission, becomes a target slip rotational speed (Nt). The controller is programmed to conduct integration accumulating the difference (ΔN) between the target slip rotational speed (Nt) and the actual slip rotational speed (SN); to determine whether the accumulated integrated value (I) is equal to or higher than a predetermined integration value (It); and to stop the integration when the accumulated integration value (I) is equal to or higher than the predetermined integration value (It).

7 Claims, 8 Drawing Sheets

U.S. PATENT DOCUMENTS

| | | | |
|---|---|---|---|
| 5,733,223 A * | 3/1998 | Matsubara et al. | 477/175 |
| 5,752,895 A | 5/1998 | Sugiyama et al. | |
| 5,807,204 A * | 9/1998 | Shiiba et al. | 477/176 |
| 5,857,443 A * | 1/1999 | Kono et al. | 123/339.2 |
| 6,039,675 A | 3/2000 | Adachi et al. | |
| 6,085,136 A * | 7/2000 | Katakura et al. | 701/51 |
| 6,652,415 B2 | 11/2003 | Segawa et al. | |
| 6,860,834 B2 | 3/2005 | Segawa et al. | |
| 7,044,888 B2 * | 5/2006 | Lee et al. | 477/167 |
| 7,188,017 B2 * | 3/2007 | Rodrigues et al. | 701/67 |
| 7,286,922 B1 * | 10/2007 | Fischer et al. | 701/51 |
| 7,366,601 B2 * | 4/2008 | Ayabe et al. | 701/51 |
| 7,369,930 B2 * | 5/2008 | Hsieh et al. | 701/67 |
| 7,386,383 B2 * | 6/2008 | Yoneda et al. | 701/69 |
| 2002/0028729 A1 * | 3/2002 | Kobayashi et al. | 477/174 |
| 2003/0125161 A1 * | 7/2003 | Tokura et al. | 477/176 |
| 2004/0102289 A1 * | 5/2004 | Aikawa et al. | 477/176 |
| 2004/0185985 A1 * | 9/2004 | Inoue | 477/70 |
| 2004/0192506 A1 * | 9/2004 | Nakamura | 477/176 |
| 2006/0148614 A1 * | 7/2006 | Takagi et al. | 477/70 |

FOREIGN PATENT DOCUMENTS

| | | |
|---|---|---|
| JP | 10-306870 A | 11/1998 |
| JP | 2002-372145 A | 12/2002 |
| JP | 2003-269603 A | 9/2003 |

* cited by examiner

LOCK-UP CLUTCH CONTROL

FIELD OF THE INVENTION

This invention relates to a control apparatus for a lock-up clutch of a torque converter used with an automatic transmission.

BACKGROUND OF THE INVENTION

In a torque converted comprising a lock-up clutch, the control of front-rear differential pressure (lockup differential pressure) of the lock-up clutch involves engagement and disengagement of the lock-up clutch. Because the torque converter makes a transition from a converter state to a lock-up state, the lock-up differential pressure sometimes gradually rises from the prescribed initial differential pressure. In such cases, the torque converter may make a transition from the converter state to the lock-up state via a slip state. In the converter state, the lock-up clutch is disengaged, in the slip state the lock-up clutch slips, and in the lock-up state the lock-up clutch is fully engaged.

Drive slip control that controls the slip rotational speed to a constant value is sometimes conducted in a slip state when a vehicle carrying a torque converter is driven at a constant low speed in a state with open throttle valve. Here, the slip rotational speed is obtained by subtracting the output rotational speed of the torque converter from the engine rotational speed (input rotational speed to the torque converter).

Patent Application Laid-open No. 2003-269603 published by Japanese Patent Office in 2003 discloses the conventional technology for inhibiting the effect of a dead band (or dead zone) of a piston of a lock-up clutch provided in a torque converter. This conventional technology is limited to the case where the operation range of the transmission is neutral and the vehicle speed is almost zero, and it involves pre-charging the piston of the lock-up clutch with oil.

SUMMARY OF THE INVENTION

However, with the drive slip control of the conventional technology, a state occurs in which the actual slip rotation does not reach the target slip rotation. This is because the actual slip rotational speed does not reach the target slip rotational speed due to torque absorption by the torque converter in a state with a low generation toque of the engine or the like. At this time, a pressure reduction command is outputted to reduce the differential pressure applied to the lock-up clutch in order to make the actual slip rotational speed equal to the target slip rotational speed. As a result, a negative differential pressure (differential pressure less than 0 MPa) is generated. With the negative differential pressure, the piston of the lock-up clutch enters the dead zone. If an accelerator pedal is stepped on in a state where the piston of the lock-up clutch is in the dead zone, the lock-up engagement is delayed and, therefore, an undesirable, very rapid increase in the engine rotational speed is induced and the driver feels uncomfortable.

With the technology for preventing the dead zone by pre-charging disclosed in Japanese Patent Application Laid-open No. 2003-269603, pre-charging is implemented and response degradation caused by the dead zone is prevented in the case a neutral gear is selected when the vehicle is stopped. However, this technology cannot prevent a rapid increase in the engine rotational speed caused by the dead zone of the piston of the lock-up clutch during drive slip control.

It is an object of this invention to prevent a rapid increase in the engine rotational speed occurring when an accelerator pedal is stepped on in the course of a drive slip control.

In order to achieve the above object, this invention provides a lock-up clutch control apparatus for controlling a lock-up clutch provided in a torque converter installed between an engine and a transmission, comprising: a differential pressure generator which engages, causes a slip of or disengages the lock-up clutch by adjusting the differential pressure supplied to the lock-up clutch; a sensor for detecting a rotational speed of the engine; a sensor for detecting an input rotational speed to the transmission; and a controller. The controller conducts proportional integration control by using a command signal to the differential pressure generator, so that an actual slip rotational speed, which is the difference between the engine rotational speed and input rotational speed to the transmission, becomes a target slip rotational speed. The controller is programmed to conduct integration accumulating the difference between the target slip rotational speed and the actual slip rotational speed; to determine whether the accumulated integrated value is equal to or higher than a predetermined integration value; and to stop the integration when the accumulated integration value is equal to or higher than the predetermined integration value.

The details as well as other features and advantages of this invention are set forth in the remainder of the specification and are shown in the accompanying drawings.

BRIEF DESCRIPTION OF THE DRAWINGS

FIG. 3 illustrates the dead zone of a piston of a lock-up clutch.

FIG. 4 illustrates the dead zone prevention control implemented by the AT controller.

DESCRIPTION OF THE PREFERRED EMBODIMENTS

Figure 1:
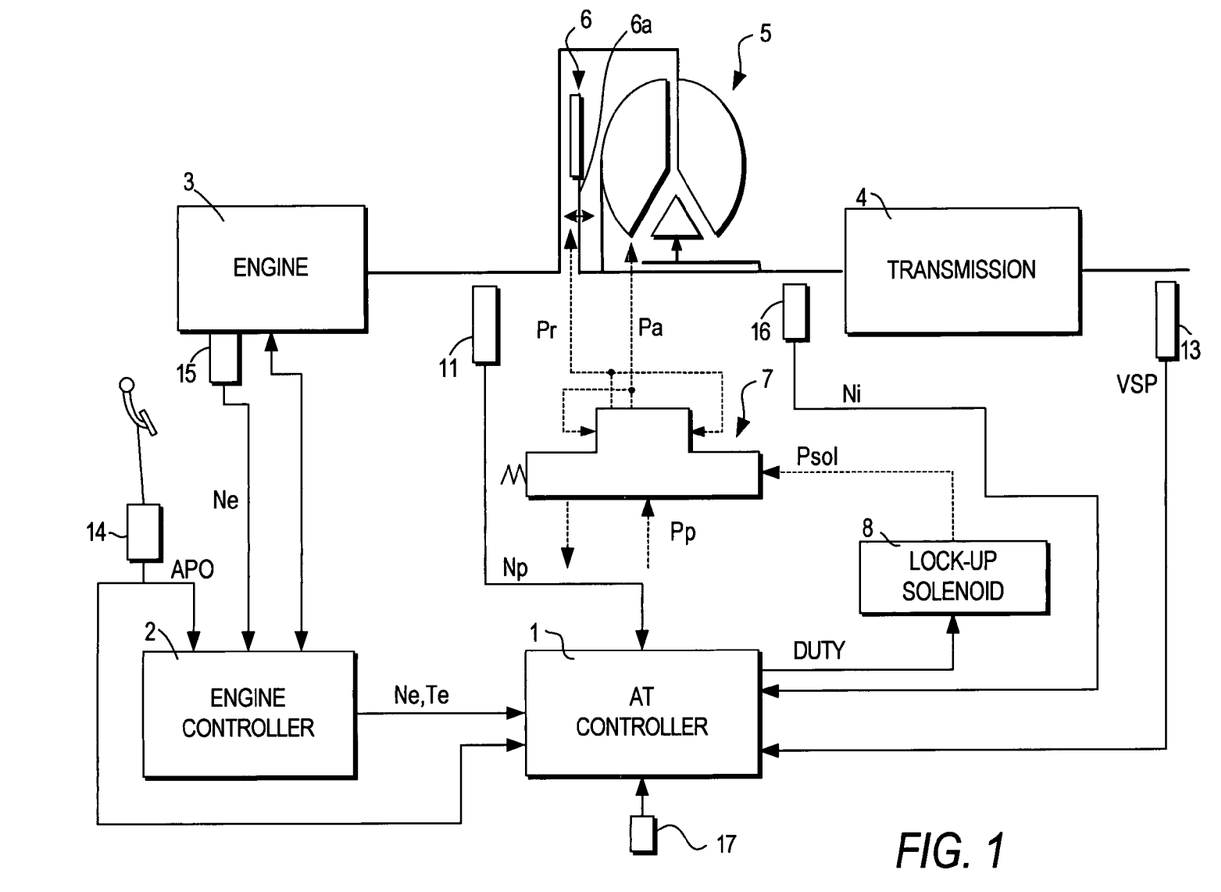
FIG. 1 is a schematic drawing of a vehicle having mounted thereon an automatic transmission and a torque converter of an embodiment.

FIG. 1 shows a vehicle in which an automatic transmission is mounted according to this embodiment. An engine 3 is coupled to a torque converter 5 and the torque converter 5 is coupled to an automatic transmission 4. The automatic transmission 4 may comprise one or more planetary gear sets, or a continuously variable transmission (CVT). The torque converter 5 comprises a lock-up clutch 6. The lock-up clutch 6 is selectively brought to a lock-up state (engaged state), an unlock-up state (disengaged state), or a slip state in accordance with the operational status of the vehicle.

The torque converter 5 transmits a drive force from the engine 3 to the transmission 4 via fluid. The torque converter 5 has incorporated therein the lock-up clutch 6 which is rotated along with a torque converter output element (turbine). When the lock-up clutch 6 is locked to a torque converter input element (impeller), the torque converter 5 is brought to the lock-up state where the input and output elements are directly coupled to each other. An AT (automatic transmission) controller 1 controls the rotation speed difference (slip) between the torque converter input element and output element.

The lock-up clutch 6 is operated in accordance with a differential pressure Pa—Pr between a torque converter apply pressure Pa and a torque converter release pressure Pr at both sides (the front and rear) of the lock-up clutch 6. When the release pressure Pr is higher than the apply pressure Pa, the lock-up clutch 6 is disengaged, thus direct coupling is not made between the torque converter input and output elements. When the release pressure Pr is much lower than the apply pressure Pa, the lock-up clutch 6 is locked, and direct coupling is made between the torque converter input and output elements.

When locking the lock-up clutch 6, a locking force, i.e. a lock-up capacity, of the lock-up clutch 6 is determined by the differential pressure Pa—Pr. The larger the differential pressure, the more the locking force of the lock-up clutch 6 increases, thereby increasing the lock-up capacity.

The differential pressure Pa—Pr is controlled by a lock-up control valve 7 which is generally known. The lock-up control valve 7 is, for example, disclosed in U.S. Pat. No. 6,860,834 granted to Segawa et al. on Mar. 1, 2005, U.S. Pat. No. 5,332,073 granted by Iizuka on Jul. 26, 1994, U.S. Pat. No. 5,752,895 granted by Sugiyama et al. on May 19, 1998, or U.S. Pat. No. 6,039,675 granted by Adachi et al. on Mar. 21, 2000.

According to this embodiment, a lock-up solenoid valve 8 uses a pump pressure Pp as the original pressure to create a signal pressure Psol applied to the lock-up control valve 7 in response to a duty signal DUTY. The lock-up control valve 7 supplies the apply pressure Pa and release pressure Pr to the lock-up clutch 6 according to the signal pressure Psol input from the lock-up solenoid valve 8. In the lock-up control valve 7, the apply pressure Pa and the release pressure Pr act to oppose each other. Further, a biasing force of a spring is added in the same direction as the apply pressure Pa, a biasing force of a spring is added in the same direction as the release pressure Pr, and at the same time the signal pressure Psol is applied in the same direction as the release pressure Pr. The lock-up control valve 7 determines the differential pressure Pa—Pr such that the oil pressure and the biasing forces of the springs are balanced. The lock-up solenoid valve 8 and the lock-up control valve 7 constitute a differential pressure generator which generates differential pressure added to the lock-up clutch.

The AT controller 1 constituted by a microcomputer and the like determines the duty signal DUTY in accordance with an operational status of the vehicle, and controls the differential pressure Pa—Pr by sending the duty signal DUTY to the lock-up solenoid valve 8. The AT controller 1 comprises a microcomputer having a central processing unit (CPU), a random access memory (RAM), a read-only memory (ROM), an input/output (I/O) interface, and a timer. Read-only memory (ROM) may be a programmable ROM.

The AT controller 1 receives signals that indicate a running state of the vehicle and an operational state of the driver. For example, these signals are signals that indicate an input shaft rotational speed Ni of the transmission 4, which is detected by an input shaft rotation sensor 16, a pump impeller rotational speed Np detected by an impeller rotation sensor 11, an accelerator pedal stroke APO (or an opening of a throttle valve TVO) detected by an accelerator pedal stroke sensor 14, the vehicle speed VSP detected by a vehicle speed sensor 13, and ON/OFF state of an idle switch 17. The input shaft of the transmission 4 corresponds to an output shaft of the torque converter 5, and the rotational speed of the input shaft of the transmission 4 is equivalent to the rotational speed of the output shaft of the torque converter 5. The pump impeller rotational speed Np is equivalent to an input rotational speed (=engine speed Ne) inputted to the torque converter 5. Further, the AT controller 1 receives signals indicative of the engine speed Ne and engine torque Te from an engine controller 2. The AT controller 1 controls locking, release, or slippage of the lock-up clutch 6 by means of these signals. The engine speed Ne is detected by an engine speed sensor 15 and is input to the engine controller 2.

The engine controller 2 comprises a microcomputer having a central processing unit (CPU), a random access memory (RAM), a read-only memory (ROM), and an input/output (I/O) interface. The engine controller 2 and the AT controller 1 may be integrated to be a single controller.

Figure 2:
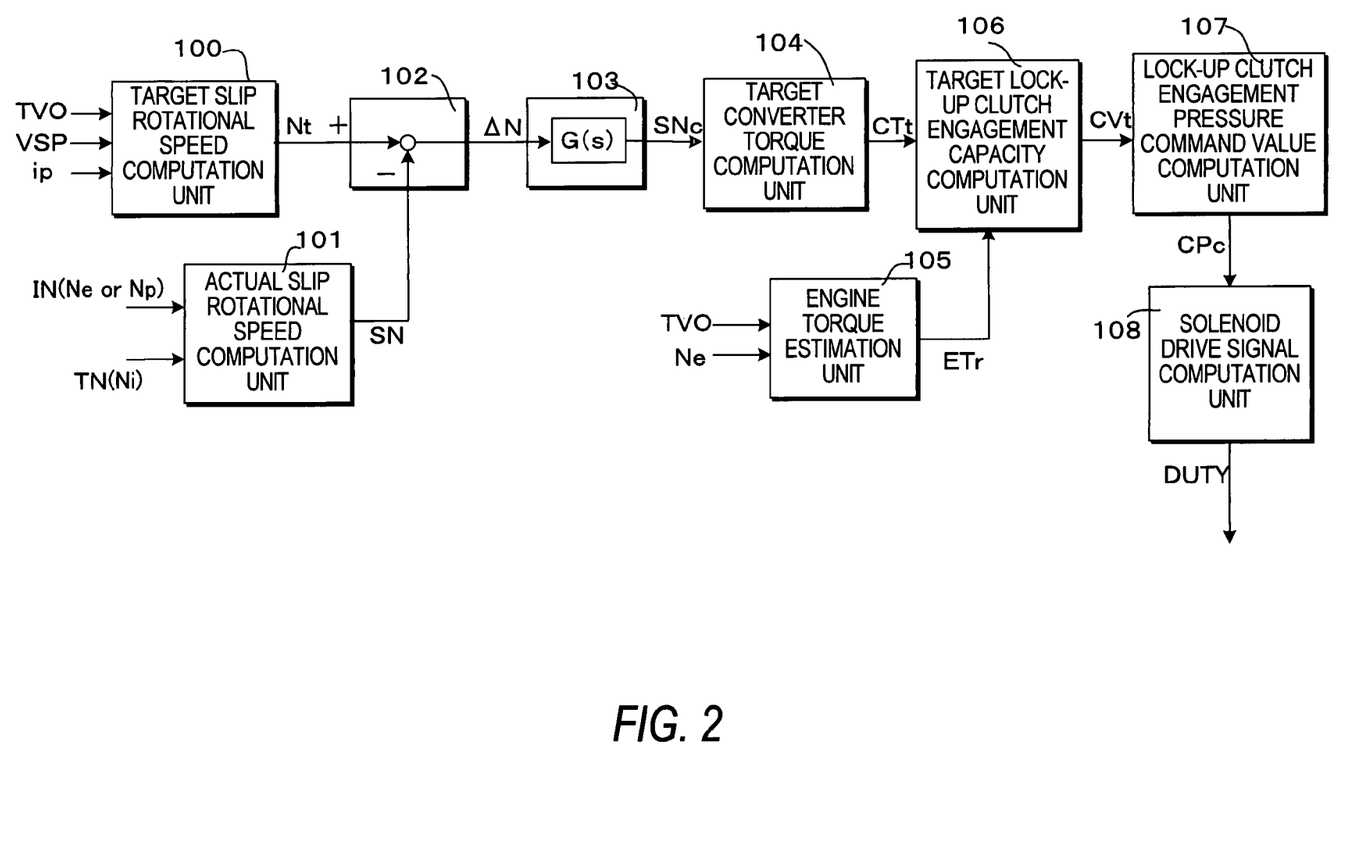
FIG. 2 is a block-diagram illustrating the drive slip control implemented by an AT controller.

Of the control procedures implemented by the AT controller 1, well-known drive slip control will be explained hereinbelow with reference to a block-diagram shown in FIG. 2. For example, the drive slip control is disclosed in U.S. Pat. No. 6,039,675 granted to Adachi, et al. on Mar. 21, 2000.

In a target slip rotational speed computation unit 100, following well-known technology, a target slip rotational speed Nt is determined based on a vehicle speed VSP, a throttle valve opening TVO (or an accelerator pedal stroke APO), and a gear ratio ip. For this purpose, the ROM of the AT controller 1 may store a look-up map or look-up table for determining a target slip rotational speed Nt based on a vehicle speed VSP, a throttle valve opening TVO (or an accelerator pedal stroke APO), and a gear ratio ip. This map is disclosed, for example, in U.S. Pat. No. 6,652,415 granted to Segawa et al. on Nov. 25, 2003 and in U.S. Pat. No. 5,569,117 granted to Kono et al. on Oct. 29, 1996, but is not limited thereto.

In the actual slip rotational speed computation unit 101, an actual slip rotational speed SN of the torque converter 5 is calculated by deducting a rotational speed TN of a turbine runner from a rotational speed IN of a pump impeller.

Here, the impeller rotational speed IN is equivalent to the engine rotational speed Ne and is also an input rotational speed to the torque converter 5. Furthermore, the turbine rotational speed TN is a rotational speed equal to the input shaft rotational speed Ni of the transmission and is also an output rotational speed from the torque converter 5.

In a slip rotational speed difference computation unit 102, a slip rotation difference ΔN, which is the difference between the target slip rotational speed Nt and actual slip rotational speed SN, is calculated.

In a slip rotational speed command value computation unit 103, a slip rotational speed command value SNc is calculated with a feedback compensator composed of proportional integration control (referred to hereinbelow as PI control) in order to eliminate the slip rotation difference ΔN.

In a target converter torque computation unit 104, a target converter torque CTt for achieving the slip rotation command value SNc at the turbine rotational speed TN is calculated.

In an engine torque estimation unit 105, an engine torque estimation value ETr is calculated by passing the engine torque value calculated from the engine rotational speed Ne and throttle valve opening TVO through a first-order delay filter in which the dynamic characteristic of the engine (transport delay component of the intake system) is reflected in a time constant T.

In a target lock-up clutch engagement capacity computation unit 106, a target lock-up clutch engagement capacity CVt is calculated by deducting the target converter torque CTt from the engine torque estimation value ETr.

In a lock-up clutch engagement pressure command value computation unit 107, a lock-up clutch engagement pressure command value CPc necessary to achieve the present target lock-up clutch engagement capacity CVt is calculated.

In a solenoid drive signal computation unit 108, a lock-up DUTY necessary to obtain the actual lock-up clutch engagement pressure as the lock-up clutch engagement pressure command value (i.e. differential pressure command value) CPc is determined and outputted as a duty signal DUTY to the lock-up clutch solenoid 8.

The above-described computation units 100 to 108 may be composed of a microcomputer and a memory of the AT controller 1.

Figure 3A:
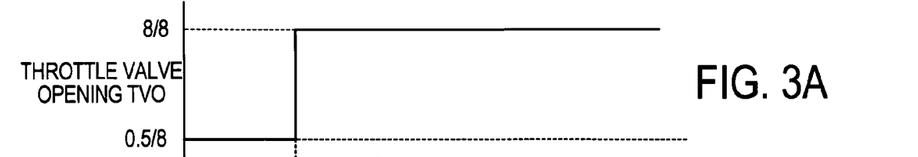
FIG. 3A is a time chart of throttle opening.
Figure 3B:
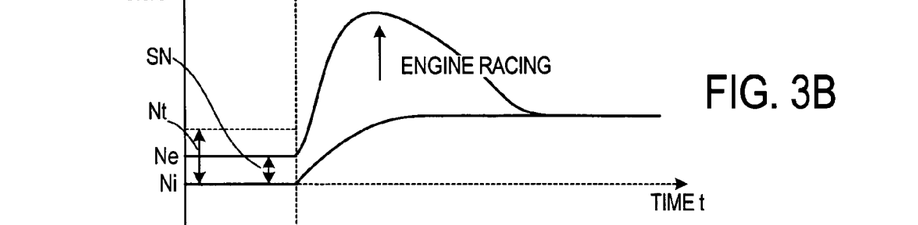
FIG. 3B is a time chart of engine rotational speed and output rotational speed from the torque converter.
Figure 3C:
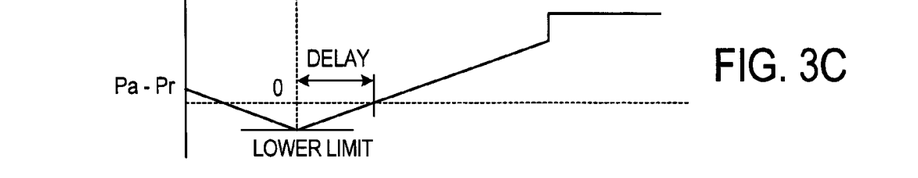
FIG. 3C is a time chart of differential pressure applied to the lock-up clutch.
Figure 4A:
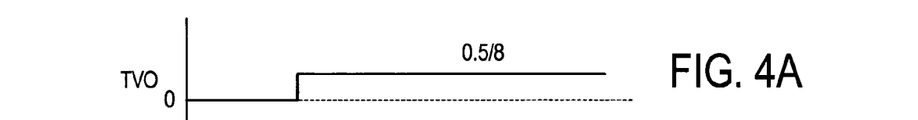
FIG. 4A is a time chart of throttle opening.
Figure 4B:
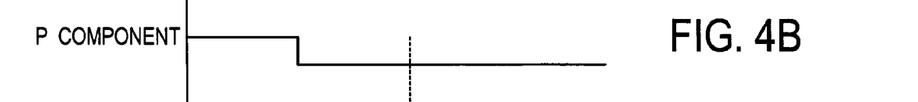
FIG. 4B is a time chart of a proportional component (P component) of feedback proportional integration control of slip rotational speed.
Figure 4C:
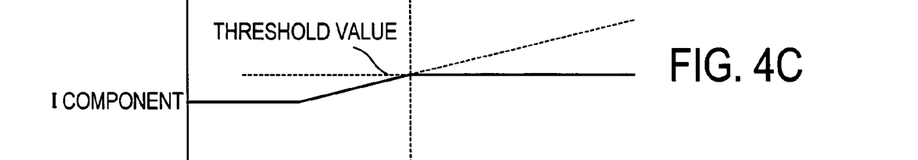
FIG. 4C illustrates the integration component (I component) of feedback proportional integration control of slip rotational speed.
Figure 4D:
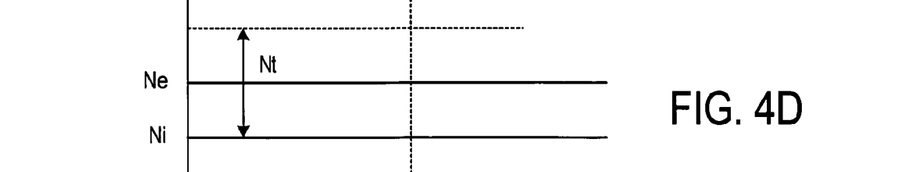
FIG. 4D is a time chart of engine rotational speed, output rotational speed from the torque converter, and target slip rotational speed.
Figure 4E:
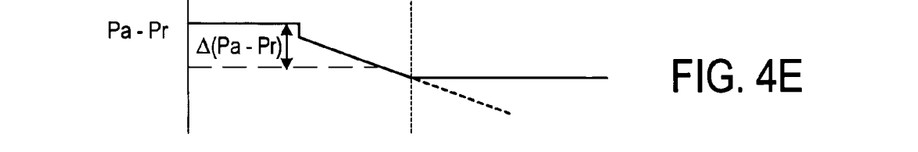
FIG. 4E is a time chart of differential pressure applied to the lock-up clutch.

The control state of the vehicle during transition from a drive slip control state to a lock-up control state will be explained with reference to FIG. 3. In a drive slip control state, the PI control is executed so that the difference (actual slip rotational speed) between the engine rotational speed Ne and input shaft rotational speed Ni becomes the target slip rotational speed, for example, at a throttle valve opening TVO=0.5/8, and the vehicle moves at a constant low speed. For example, when the throttle valve opening TVO=0.5/8, the control state makes a transition to the lock-up control state.

More specifically, first, when the actual slip rotation does not reach the target slip rotation in a drive slip control state, the operation pressure (differential pressure Pa—Pr) acting upon the lock-up clutch 6 decreases so as to obtain the target slip rotation by increasing the engine rotational speed Ne. However, in the drive slip control state, because the generated torque from the engine is low, the generated torque is absorbed by the torque converter 5 and thus the engine rotational speed Ne does not increase following the decrease in the operation pressure. For this reason, because the AT controller 1 continues to output a DUTY signal further reducing the operation pressure acting upon the lock-up clutch 6, the operation pressure acting upon the lock-up clutch 6 sometimes decreases and the pressure difference with the torque converter 5 sometimes becomes a negative differential pressure less than 0 MPa.

If the accelerator pedal is stepped on from the state with this negative differential pressure, lock-up control is started, but the lock-up control is substantially not started till the differential pressure returns to 0. The differential pressure region from the lower limit to 0 becomes a dead zone of the piston 6a of the lock-up clutch 6, the engine rotational speed rapidly increases, and the driver feels uncomfortable.

In order to prevent the appearance of the dead zone, the integration value I relating to the feedback PI control of the drive slip control is detected and the integration value I is limited so as not to exceed the predetermined value It. In other words, the integration operation is stopped when the integration value I reaches the predetermined value It. As a result, the differential pressure is limited and the dead zone does not appear. Here, the integration value I is a time integration value of difference ΔN between the target slip rotational speed Nt and actual slip rotational speed SN. As shown in FIG. 4, the differential pressure variation Δ(Pa—Pr), which is an operation value in the PI control, decreases proportionally to the integration value I. The differential pressure variation Δ(Pa—Pr) is a sum of a proportional component (P component), which is proportional to the difference ΔN, and an integration component (I component), which is proportional to the integration value. Thus, $\Delta(Pa-Pr) = kp \times \Delta N - ki \times I$.

Referring to FIG. 4, the integration value I and a threshold It will be compared by using the integration value I of the PI control conducted when the actual slip rotational speed SN is controlled to the target slip rotational speed. When the integration value I reaches the threshold value It, the integration operation is stopped, the integration value I is maintained at a constant level, and decrease in the pressure (differential pressure) acting upon the lock-up clutch 6 is inhibited. The threshold value It is set correspondingly to the differential pressure (close to zero) where the dead zone of the piston 6a of the lock-up clutch 6 occurs. Thus, the threshold value It limits the integration value I so that the differential pressure does not reach the differential pressure value at which the dead zone of the piston 6a of the lock-up clutch 6 occurs.

During the drive slip control, conducting the control so that the differential pressure does not become less than the fixed value prevents the occurrence of the dead zone of the piston 6a of the lock-up clutch 6, prevents the engine rotational speed from rapidly increasing, and prevents the driving performance from degrading.

Figure 5:
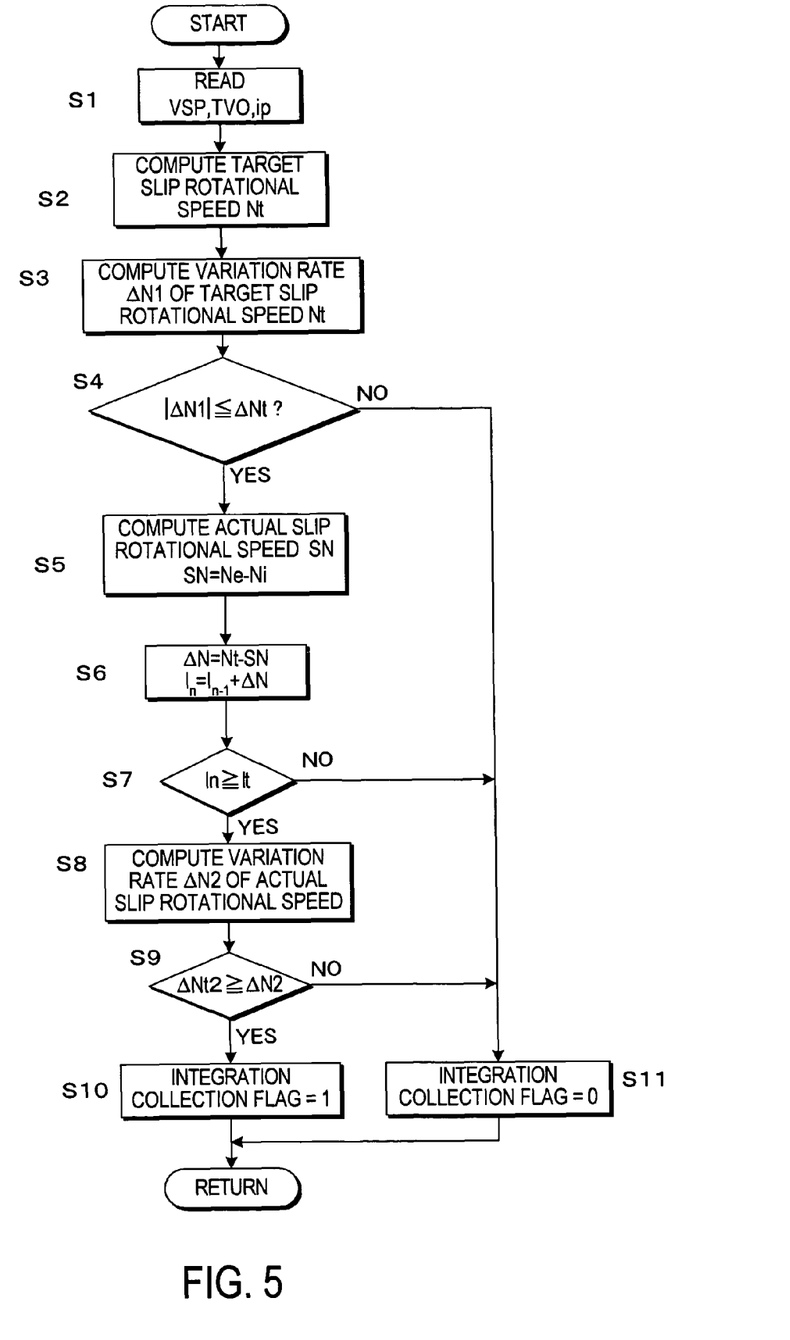
FIG. 5 is a flowchart illustrating the calculation of integration value and the setting of an integration collection flag implemented by the AT controller.

An integration value accumulation routine executed in the AT controller 1 will be explained with reference to the flowchart shown in FIG. 5. The integration value accumulation routine is used to determine the accumulation state of the integration value and is repeatedly executed, for example, by timer interruption.

In step S1, the vehicle speed VSP, throttle valve opening TVO, and gear ratio ip are read. In step S2, the target slip rotational speed Nt is calculated from the vehicle speed VSP, throttle valve opening TVO, and gear ratio ip. In step S3, the variation rate ΔN1 of the target slip rotational speed is found by calculating the difference between the computed present target slip rotational speed Nt and the target slip rotational speed that was computed in the previous cycle of the integration value accumulation routine and stored in the RAM of the AT controller 1.

In step S4, a decision is made as to whether or not the absolute value of the variation rate ΔN1 is less than the predetermined variation rate ΔNt. If the absolute value of the variation rate ΔN1 is equal to or lower than the predetermined variation rate ΔNt (e.g. a value near 0 rpm/second), the target slip rotational speed is stable and the routine advances to step S5 for computing the integration value. If the absolute value of the variation rate ΔN1 exceeds the predetermined variation rate ΔNt, the target slip rotational speed is unstable, the routine advances to step S11, the integration collection flag is set to 0, and the control routine ends.

In step S5, the engine rotational speed Ne (or pump impeller rotational speed Np) and input shaft rotational speed Ni are read. Then, the difference between the engine rotational speed Ne and input shaft rotational speed Ni is calculated as an actual slip rotational speed SN. Then, in step S6, the actual slip rotational speed SN is compared with the target slip rotational speed Nt calculated in step S2 and the difference ΔN between the target slip rotational speed Nt and actual slip rotational speed SN is calculated. The sum of the difference ΔN and the integration value $I_{n-1}$ obtained by integration conducted before the routine of the previous cycle has ended, becomes a new integration value In.

Then, in step S7, a decision is made as to whether or not the calculated integration value I ($=I_n$) is not more than the threshold value It. If the integration value I is equal to or higher than the threshold value It, the routine advances to step S8. If the integration value I has not reached the threshold value, the routine advances to step S11.

In step S8, the variation rate ΔN2 of the actual slip rotational speed is found by calculating the difference between the present actual slip rotational speed SN and the actual slip rotational speed calculated in the previous cycle and stored in the RAM of the AT controller 1. In step S9, a decision is made as to whether or not the variation rate ΔN2 is less than the prescribed variation rate ΔNt2 (e.g. 20 rpm/second). If the variation rate ΔN2 is equal to or less than the prescribed variation rate ΔNt2, a decision is made that the change in the actual slip rotational speed is small with respect to the differential pressure command value and that the piston of the lock-up clutch is in the dead zone, and the routine advances to step S10. In step S10, the integration collection flag is set to 1 and the control routine then ends. If the variation rate ΔN2 has exceeded the prescribed variation rate ΔNt2, the routine advances to step S11 where the integration collection flag is set to 0, and the control routine then ends. The integration collection flag set to 1 indicates that the change in the actual slip rotational speed is small even if the integration value exceeds the predetermined value It. The integration collection flag will be used in the below-described steps S41, S42.

Figure 6:
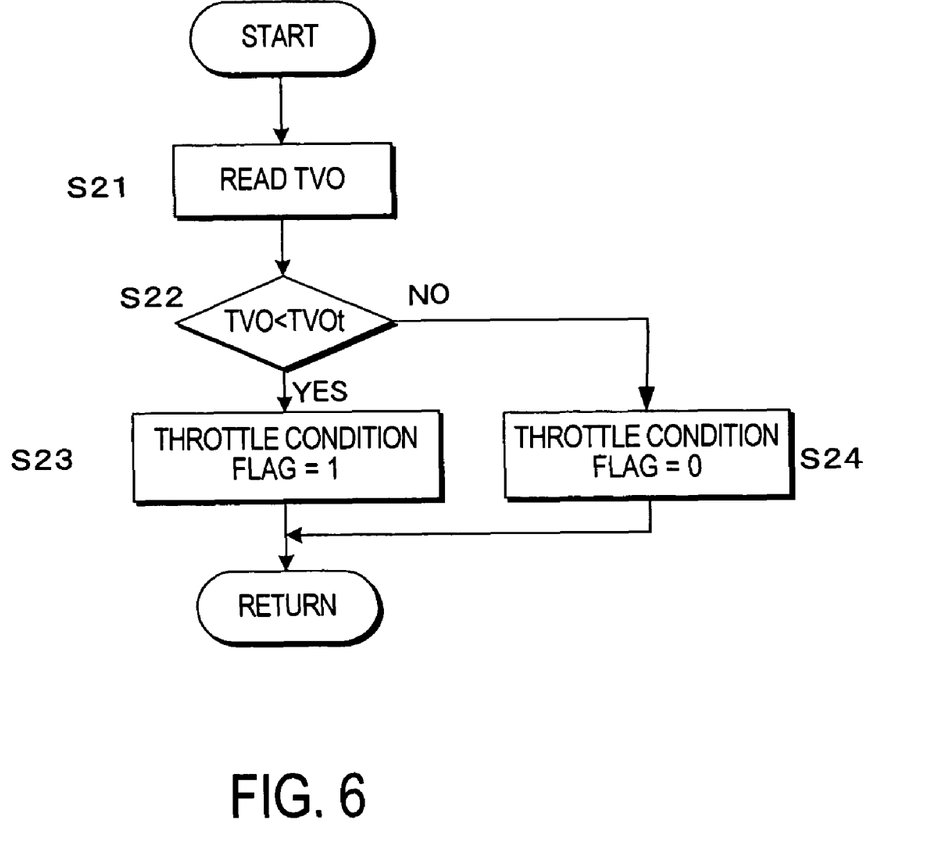
FIG. 6 is a flowchart illustrating the setting of a throttle condition flag implemented by the AT controller.

The flowchart shown in FIG. 6 illustrates the determination routine for determining the throttle valve opening TVO conditions. The AT controller 1 executes this determination routine, for example, by timer interruption.

In step S21, the throttle valve opening TVO is read. In step S22, a decision is made as to whether or not the throttle valve opening TVO that was read is less than the predetermined opening TVOt (e.g. ⅛). If the throttle valve opening TVO is less than the predetermined opening TVOt, the routine advances to step S23. In step S23, because the throttle valve opening TVO is sufficiently small, the throttle condition flag is set to 1. If the throttle valve opening TVO is equal to or higher than the predetermined opening TVOt, the routine advances to step S24, the throttle condition flag is set to 0, and the control routine ends. The throttle condition flag will be used in the below-described steps S41, S42.

Figure 7:
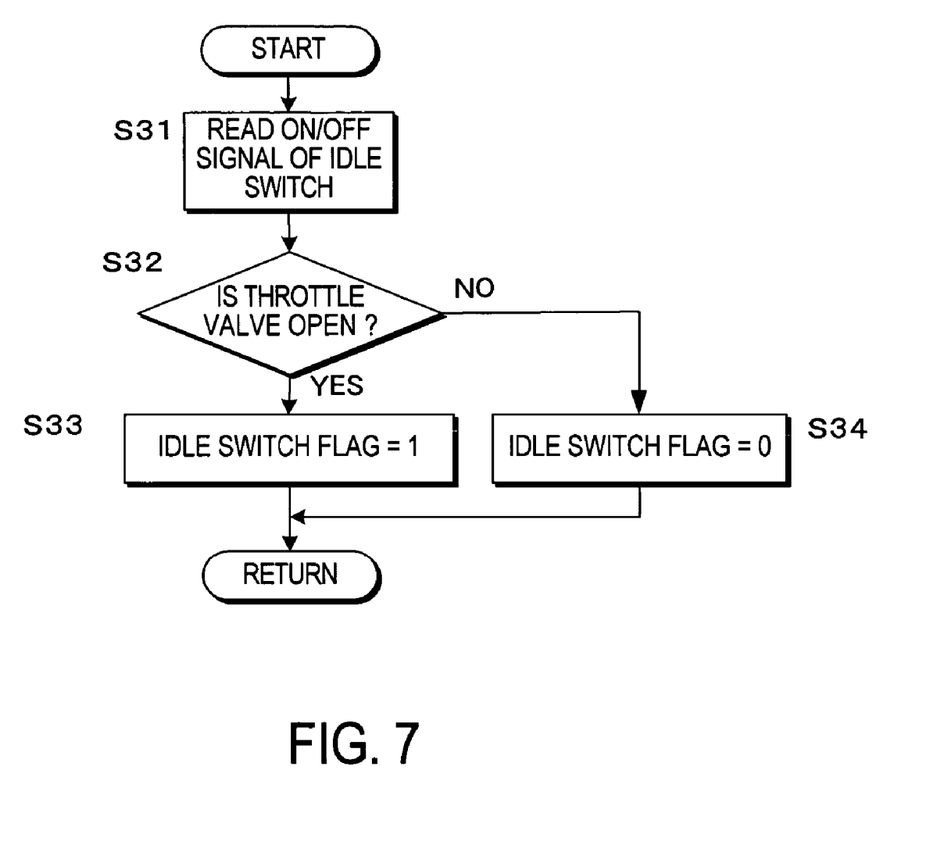
FIG. 7 is a flowchart illustrating the setting of an idle switch flag implemented by the AT controller; the idle switch flag is a flag indicating ON/OFF of the idle switch.

The flowchart shown in FIG. 7 illustrates the determination routine for determining the idle switch conditions. An idle switch 17 determines whether the accelerator pedal is stepped on or whether the throttle valve is closed or opened. The throttle valve adjusts the flow rate of air supplied to the engine. In a state where the accelerator pedal is completely returned, the idle switch 17 assumes an ON state and the drive slip control is not executed. The AT controller 1 repeatedly executes this determination routine by timer interruption or the like.

In step S31, an ON/OFF signal of the idle switch 17 is read. In step S32, a decision is made as to whether or not the idle switch 17 is OFF, that is, whether or not the throttle valve is in the open state. If the throttle valve is in the open state (throttle opening degree≠0), the routine advances to step S33 and the idle switch flag is set to 1. If the throttle valve is in the closed state (throttle opening degree=0), the routine advances to step S34 and the idle switch flag is set to 0. The idle switch flag will be used in the below-described steps S41, S42.

Figure 8:
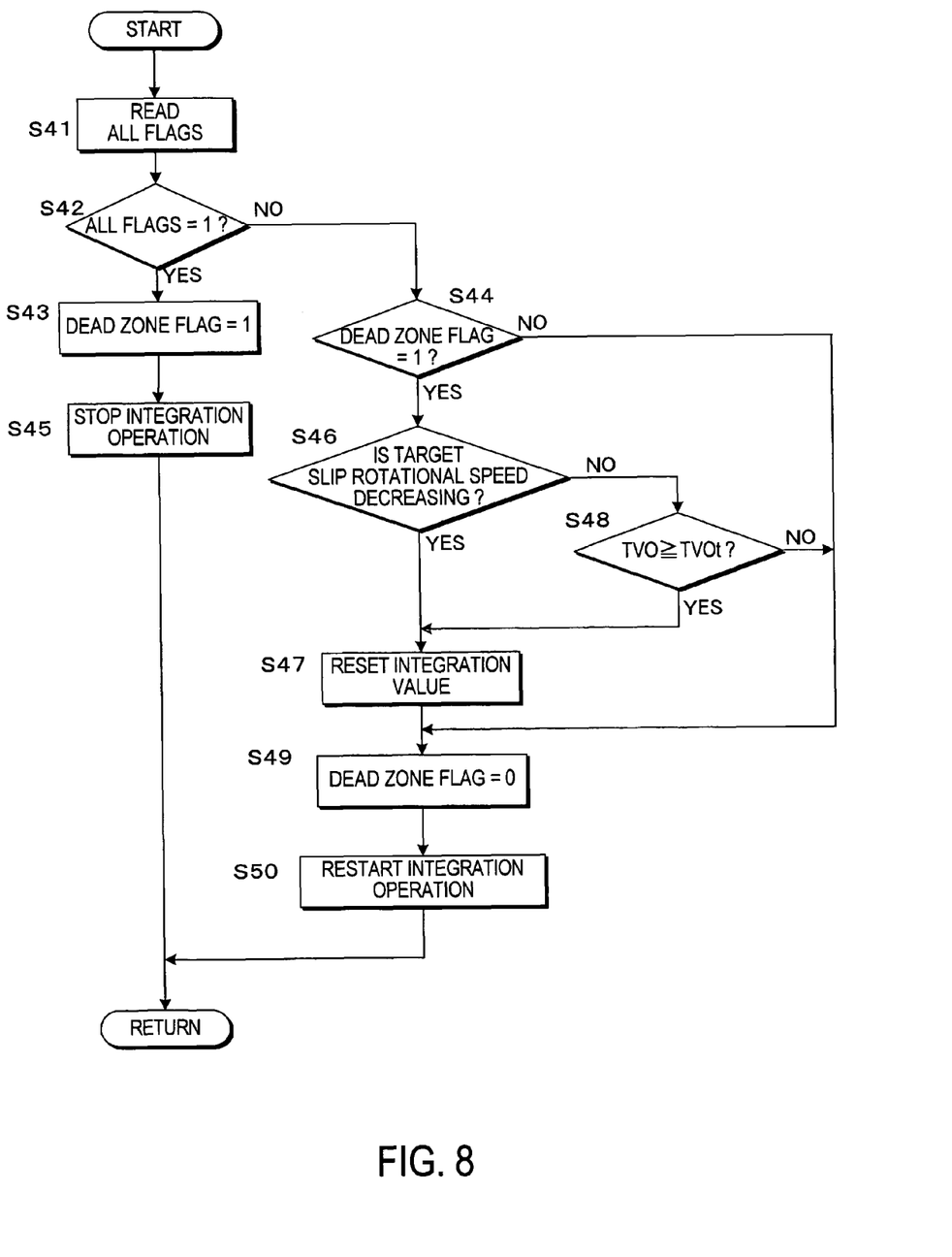
FIG. 8 is a flow chart illustrating stopping/restarting of the integration and dead zone determination implemented by the AT controller.

The flowchart of FIG. 8 illustrates the determination routine for determining the dead zone state of the lock-up clutch piston from the accumulation state of the integration value I. The AT controller 1 repeatedly executes this determination routine by timer interruption or the like.

In steps S41, S42, a decision is made as to whether the integration collection flag, throttle condition flag, and idle switching flag set in the above-described routines have all been set to 1. If they were all set to 1, the routine advances to step S43, and if even one flag is 0, the routine advances to step S44.

In step S43, the dead zone flag indicating that the piston 6a of the lock-up clutch is in the dead zone is set to 1, and the integration operation is stopped in the subsequent step S45.

In step S44, a decision is made as to whether the dead zone flag is 1. If the dead zone flag is 1, the routine advances to step S46. If the dead zone flag is 0, the routine advances to step S49.

In step S46, the vehicle speed VSP, throttle valve opening TVO, and gear ratio ip are read, and the target slip rotational speed Nt is calculated from the vehicle speed VSP, throttle valve opening TVO, and gear ratio ip. Furthermore, based on the past computation results on the target slip rotational speed that were stored in the RAM of the AT controller 1 and the present computation results, a decision is made whether the target slip rotational speed Nt has a tendency to decrease. For example, when the calculated target slip rotational speed Nt at present is less than the last one, a decision is made that the target slip rotational speed Nt has a tendency to decrease.

When the target slip rotational speed Nt has a tendency to decrease, the operation pressure acting upon the lock-up clutch 6 increases, and the piston 6a of the lock-up clutch 6 exits the dead zone. Therefore, the routine advances to step S47 in order to reset the integration value I. In step S47, the integration value I is reset under the prescribed conditions.

When the target slip rotational speed Nt has a tendency to increase or does not change, the routine advances to step S48. In step S48, the throttle valve opening TVO is read and a decision is made as to whether the throttle valve opening TVO is not less than the predetermined opening TVOt. If the throttle valve opening TVO is equal to or larger than the predetermined opening TVOt, the piston 6a of the lock-up clutch 6 exits from the dead zone due to increase in the engine rotation speed. Therefore, the routine advances to step S47 to reset the integration value I. If the throttle valve opening TVO has not reached the predetermined opening TVOt, the routine advances to step S49.

In step S49, the dead zone flag is set to 0, the integration operation is restarted in the subsequent step S50, and the routine ends.

Figure 9:
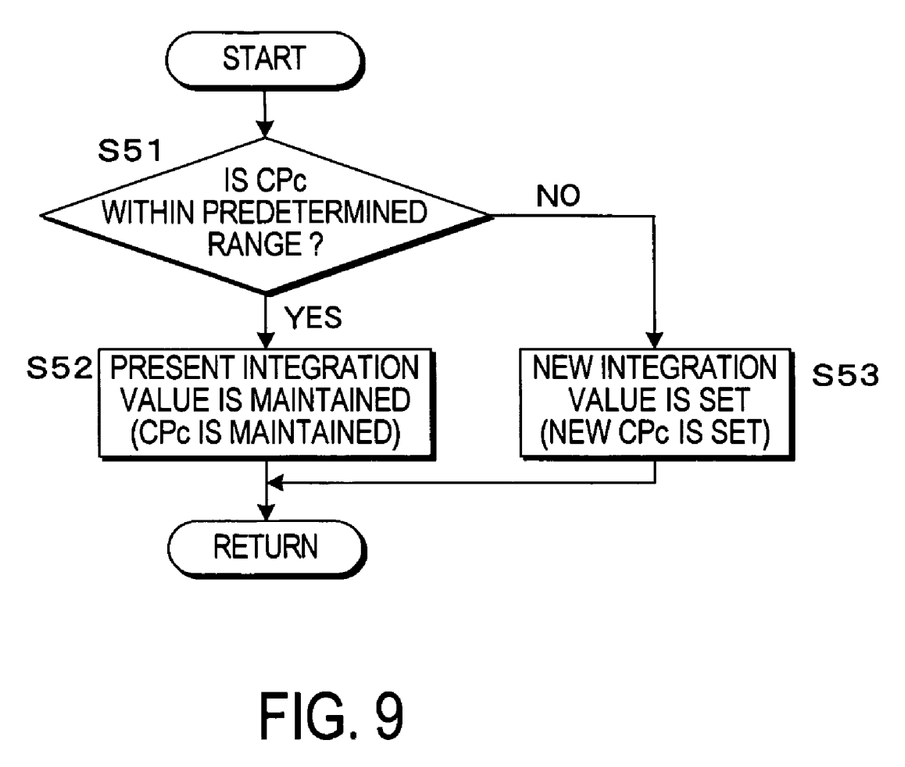
FIG. 9 is a flow chart for explaining the reset processing of the integration value implemented by the AT controller.

FIG. 9 shows a flowchart explaining the reset determination of the differential pressure command value CPc executed in step S47.

In step S51, a decision is made as to whether or not the differential pressure command value CPc of the present step is within the predetermined range. Here, the lower limit of the predetermined range is a value (close to 0) close to the differential pressure corresponding to the dead zone, and the upper limit of the predetermined range is the allowed upper limit differential pressure in a normal state at which the piston 6a of the lock-up clutch is not in the dead zone. Therefore, if the differential pressure command value CPc is in the predetermined range, in step S52 the present integration value I is maintained. In other words, the present differential pressure command value CPc is set as the reset value of the differential pressure command value CPc, and the differential pressure command value CPc is maintained. If the differential pressure command value CPc is within the predetermined range, in step S53 the integration value I is set to a new integration value, and a new differential pressure command value corresponding to this new integration value is set.

As described hereinabove, stopping the integration operation of the feedback PI control prevents the integration value I from becoming less than the predetermined value. As a result, the piston 6a of the lock-up clutch 6 is prevented from entering the dead zone region. Therefore, the rotational speed of the engine does not increase rapidly even when the accelerator pedal is stepped on from a drive slip control state.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

The entire contents of Japanese Patent Application P2004-310015 (filed Oct. 25, 2004) are incorporated herein by reference.

What is claimed is:

1. A lock-up clutch control apparatus for controlling a lock-up clutch provided in a torque converter installed between an engine and a transmission in a vehicle, comprising:
   a differential pressure generator which engages, causes a slip of or disengages the lock-up clutch by adjusting differential pressure supplied to the lock-up clutch;
   a sensor for detecting a rotational speed of the engine;
   a sensor for detecting an input rotational speed to the transmission; and
   a controller for conducting proportional integration control by using a command signal to the differential pressure generator, in order that an actual slip rotational speed, which is a difference between the engine rotational speed and the input rotational speed to the transmission, can become a target slip rotational speed,
   wherein the controller is programmed:
      to calculate a variation rate of the target slip rotational speed and determine whether the absolute value of the variation rate is equal to or less than a predetermined target slip rotational speed variation rate;
      to conduct integration accumulating a difference between the target slip rotational speed and the actual slip rotational speed;
      to determine whether an accumulated integration value is equal to or higher than a predetermined integration value; and
      to stop the integration when the accumulated integration value is equal to or higher than the predetermined integration value and when the absolute value of the variation rate of the target slip rotational speed is equal to or less than the predetermined target slip rotational speed variation rate, while the vehicle moves at a constant speed.

2. The lock-up clutch control apparatus as defined in claim 1, wherein the controller is further programmed:
   to calculate a variation rate of the actual slip rotational speed and determine whether the variation rate is equal to or less than a predetermined actual slip rotational speed variation rate; and
   to stop the integration when the accumulated integration value is equal to or higher than the predetermined integration value and the variation rate of the actual slip rotational speed is equal to or less than the predetermined actual slip rotational speed variation rate.

3. The lock-up clutch control apparatus as defined in claim 1, comprising a sensor for detecting opening and closing of a throttle valve which adjusts a flow rate of air supplied to the engine, wherein the controller is further programmed:
   to determine whether the throttle valve opening is less than a predetermined opening; and
   to stop the integration when the accumulated integration value is equal to or higher than the predetermined integration value and the throttle valve opening is less than the predetermined opening.

4. The lock-up clutch control apparatus as defined in claim 1, comprising a sensor for detecting an idle state of the engine, wherein the controller is further programmed to stop the integration when the accumulated integration value is equal to or higher than a prescribed integration value and the engine is not in the idle state.

5. A lock-up clutch control apparatus for controlling a lock-up clutch provided in a torque converter installed between an engine and a transmission in a vehicle, comprising:
   differential pressure generator means which engages, causes a slip of or disengages the lock-up clutch by adjusting differential pressure supplied to the lock-up clutch;
   detecting means for detecting a rotational speed of the engine;
   detecting means for detecting an input rotational speed to the transmission; and
   control means for conducting proportional integration control by using a command signal to the differential pressure generator, in order that an actual slip rotational speed, which is a difference between the engine rotational speed and the input rotational speed to the transmission, can become a target slip rotational speed,
   said control means comprising:
      calculating means for calculating a variation rate of the target slip rotational speed;
      determining means for determining whether the absolute value of the variation rate is equal to or less than a predetermined target slip rotational speed variation rate;
      conducting means for conducting integration accumulating a difference between the target slip rotational speed and the actual slip rotational speed;
      determining means for determining whether an accumulated integration value is equal to or higher than a predetermined integration value; and
      stopping means for stopping the integration when the accumulated integration value is equal to or higher than the predetermined integration value and when the absolute value of the variation rate of the target slip rotational speed is equal to or less than the predetermined target slip rotational speed variation rate, while the vehicle moves at a constant speed.

6. A lock-up clutch control method for use with a control device for controlling a lock-up clutch provided in a torque converter installed between an engine and a transmission in a vehicle, the control device comprising:

a differential pressure generator which engages, causes a slip of or disengages the lock-up clutch by adjusting differential pressure supplied to the lock-up clutch;

a sensor for detecting a rotational speed of the engine;

a sensor for detecting an input rotational speed to the transmission; and a controller for conducting proportional integration control by using a command signal to the differential pressure generator, in order that an actual slip rotational speed, which is a difference between the engine rotational speed and the input rotational speed to the transmission, can become a target slip rotational speed, the lock-up clutch control method comprising:

calculating a variation rate of the target slip rotational speed and determining whether the absolute value of the variation rate is equal to or less than a predetermined target slip rotational speed variation rate;

conducting integration accumulating a difference between the target slip rotational speed and the actual slip rotational speed;

determining whether an accumulated integration value is equal to or higher than a predetermined integration value; and stopping the integration when the accumulated integration value is equal to or higher than the predetermined integration value and when the absolute value of the variation rate of the target slip rotational speed is equal to or less than the predetermined target slip rotational speed variation rate, while the vehicle moves at a constant speed.

7. The lock-up clutch control apparatus as defined in claim 1, comprising a sensor for detecting an idle state of the engine, wherein the controller is further programmed to stop the integration when the accumulated integration value is equal to or higher than the predetermined integration value and the engine is not in the idle state.

* * * * *